F. W. JACOBI.
DEVICE FOR INSEAM MEASUREMENTS.
APPLICATION FILED SEPT. 24, 1908.
949,931.
Patented Feb. 22, 1910.
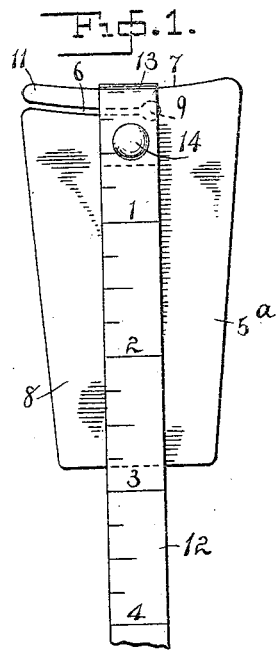
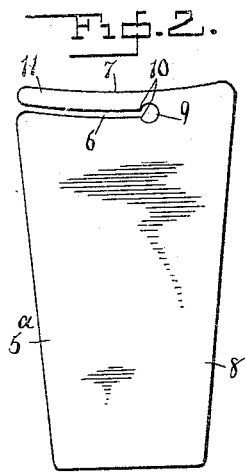
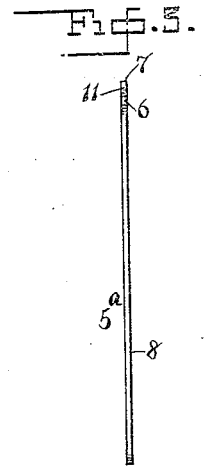
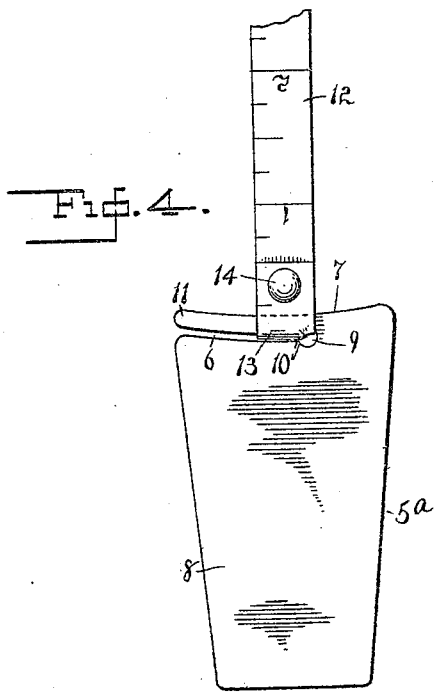
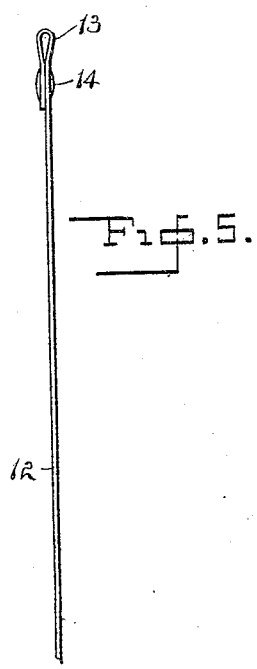
WITNESSES:
Mathew J. Marty
C. F. Bassett
INVENTOR
Frederick W. Jacobi
BY Frederick Benjamin
ATT'Y.

UNITED STATES PATENT OFFICE.

FREDERICK W. JACOBI, OF CHICAGO, ILLINOIS.

DEVICE FOR INSEAM MEASUREMENTS.

949,931. Specification of Letters Patent. Patented Feb. 22, 1910.

Application filed September 24, 1908. Serial No. 454,502.

*To all whom it may concern:*

Be it known that I, FREDERICK W. JACOBI, a citizen of the United States, residing at Chicago, in the county of Cook and State of Illinois, have invented certain new and useful Improvements in Devices for Inseam Measurements, of which the following is a specification.

My invention relates to measuring devices and is particularly applicable for tailors' use in fitting garments.

The chief objects of the improvements which form the subject matter of this application are:—to provide an instrument especially adapted to aid in taking inseam measurements; to furnish a crotch device to be used in coöperation with a tape measure for the purpose stated, and to produce a simple and efficient article by means of which the tape measure can be quickly applied to and temporarily retained in locations not conveniently reached by the fingers while grasping the end of the tape.

A further object of my invention and one that I consider of importance is to furnish means for retaining the coöperating parts in connected relation while in use thus preventing their becoming separated by ordinary manipulation and yet that will permit them to be quickly removed and replaced as the special use of the measuring tape may require from time to time.

I accomplish the above desirable results by means of the device illustrated in the accompanying drawing, forming a part of this application, and in which the details of construction are set forth in the following views:—

Figure 1 is a side elevation of the plate and tape measure attached showing the manner of its use, only a portion of the tape being shown; Fig. 2 is a side elevation of the plate detached from the measure; Fig. 3 is an edge view of the plate; Fig. 4 is a side view of the plate suspended by the tape, showing the action of the retaining means, and Fig. 5 is an edge view of a portion of the tape removed from engagement with the plate.

Referring to the details of the drawing, the numeral $5^a$ indicates a plate of suitable material, having a slot 6 extending parallel with the upper margin 7 which is preferably made slightly concave, as shown, to fit the crotch of a pair of trousers, this being the locality in which it is generally employed.

I prefer to form the plate $5^a$ of metal, suitably finished, but different materials, such as celluloid, rubber and other suitable substances may be employed if found desirable. The shape shown in the drawing is the preferred form, but the part 8, opposite the slot forming a handle with which the implement is grasped may have a different outline if desired. The slot 6 is preferably slightly curved, as shown, to correspond with the contour of the end margin 7 and terminates in an enlargement or eye 9. I prefer to make this eye circular, as shown, by drilling or punching a round hole in the process of manufacture, said hole being of greater diameter than the slot, thus forming sharp angles or barbs 10 at the point of junction of the slot and hole margins. The portion of the plate between the slot and the margin 7 forms an elongated prong or beak 11, rounded at the extremity, to facilitate the engagement of the coöperating member in the manner hereinafter described. This plate is to be used in conjunction with an ordinary tape measure 12, upon one end of which is formed a permanent loop 13 made by doubling the extremity over, as shown in Fig. 5 and securing the end by a rivet 14 or any other convenient means.

The manner of using the device in coöperation with a tape measure looped as shown, is made clear in Fig. 1. The loop 13 is slipped over the beak 11 and carried clear to the end of the slot and the tape is then permitted to fall to the position shown in Fig. 1 and while the plate held in one hand with the thumb or fingers upon the tape is carried to the required position in the crotch, the other hand of the operator manipulates the free end of the tape while taking the measurement in the usual manner. When the measurement is determined the plate may be dropped to the position shown in Fig. 4 where it is held suspended by the tape the point or angle 10 preventing the plate from becoming accidentally detached from the measure, the tension upon the tape causing its margin to pucker within the aperture 9 which thus renders the engagement of the point 10 more effective. This retention of the plate in connection with the tape when the latter is slackened or placed upon the arm of the user, or other support, is a very important feature since the crotch device will thus be conveniently at hand when wanted and other measurements not requiring the plate may be taken with the same tape line while the parts are still connected. A special tape line is shown in the drawing, having a blank end extending beyond the beginning of the graduations, to a sufficient length to allow for the loop 13. An ordinary tape measure having its end looped as shown, may be employed, in which case allowance would have to be made when measuring for the shortening of the graduated portion.

Having thus described my invention, what I claim as new, is:—

1. A measuring device, comprising a plate provided with an aperture, and having a slot extending from one of the side margins of the plate to said aperture, said slot and aperture forming a tongue on said plate, and a tape adapted to engage said tongue.

2. A measuring device comprising an oblong plate provided with an open transverse slot, and a tongue, and a flexible tape adapted to detachably engage said tongue.

3. A measuring device comprising a plate provided with a slot and a projection on one margin of said slot, and a tape provided with a loop adapted to detachably engage said projection, and means on said plate for preventing the accidental displacement of said tape.

In testimony whereof I affix my signature in the presence of two witnesses.

FREDERICK W. JACOBI.

Witnesses:
Wm. B. Moore,
Chas. F. Bassett.